W. MUELLER.
RECOVERY OF AMMONIA FROM DISTILLATION GASES.
APPLICATION FILED SEPT. 3, 1910.

1,045,590.                                        Patented Nov. 26, 1912.
                                                         3 SHEETS—SHEET 1.

Fig. 1.

WITNESSES
W. P. Burk
John A. Percival

INVENTOR
Wilhelm Mueller
By Wm. Wallace White
    ATTY.

W. MUELLER.
RECOVERY OF AMMONIA FROM DISTILLATION GASES.
APPLICATION FILED SEPT. 3, 1910.
1,045,590.
Patented Nov. 26, 1912.
3 SHEETS—SHEET 2.
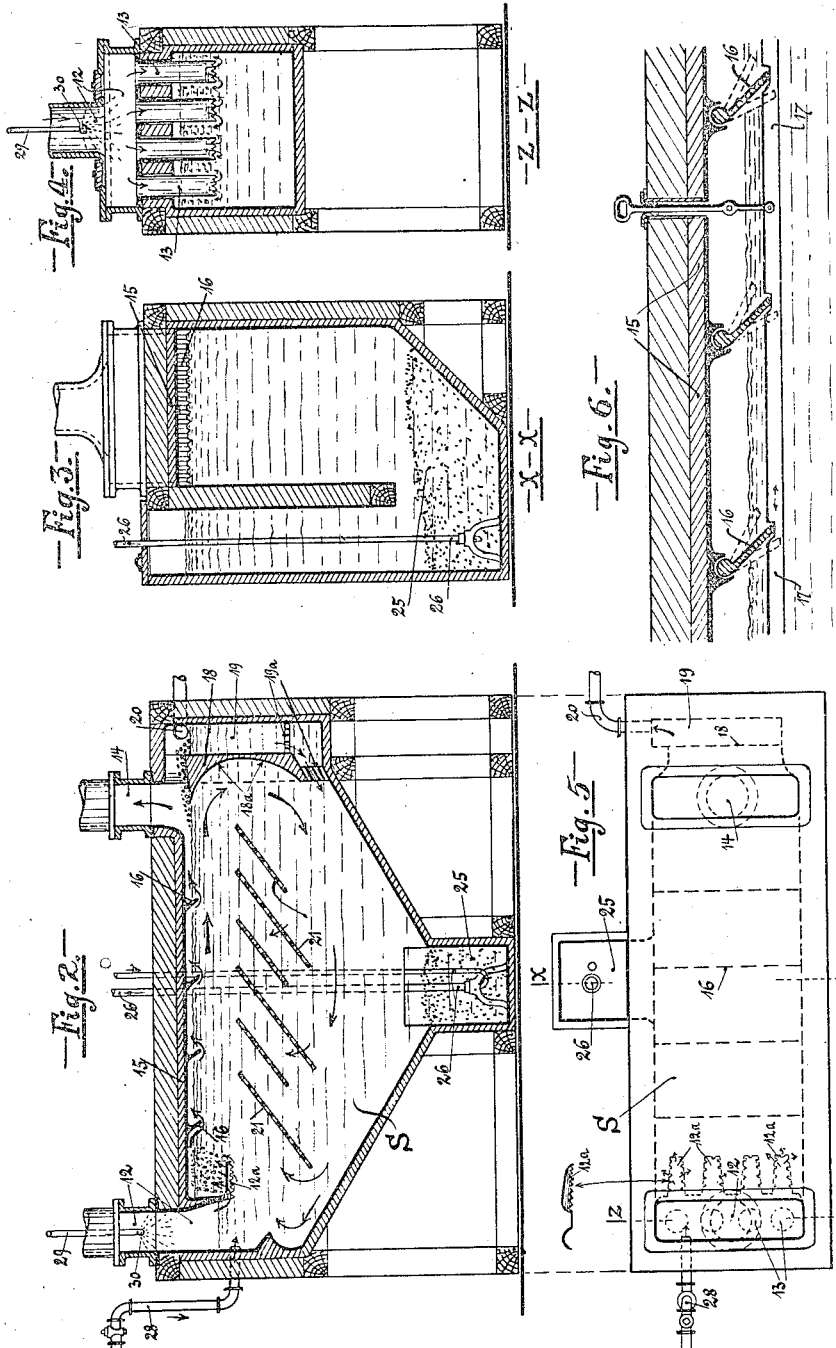

W. MUELLER.
RECOVERY OF AMMONIA FROM DISTILLATION GASES.
APPLICATION FILED SEPT. 3, 1910.
1,045,590.
Patented Nov. 26, 1912.
3 SHEETS—SHEET 3.
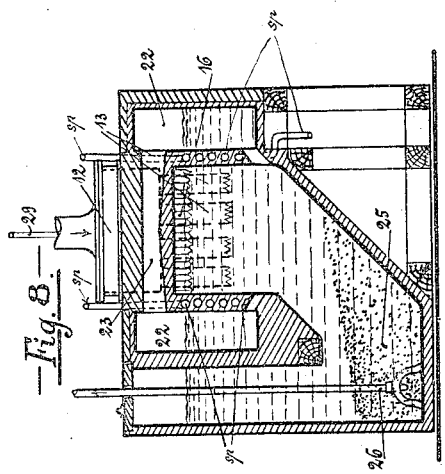
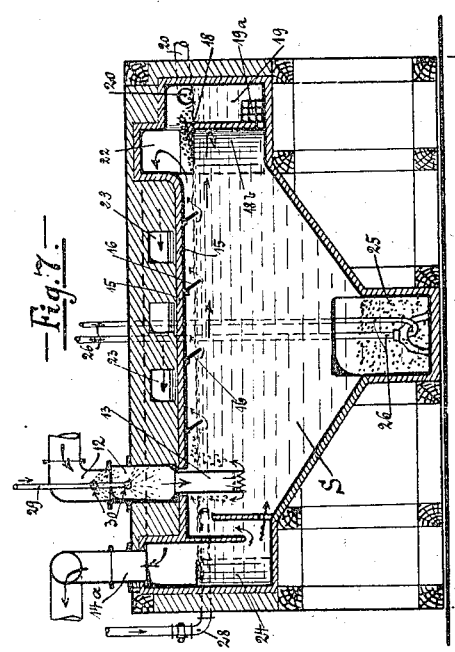
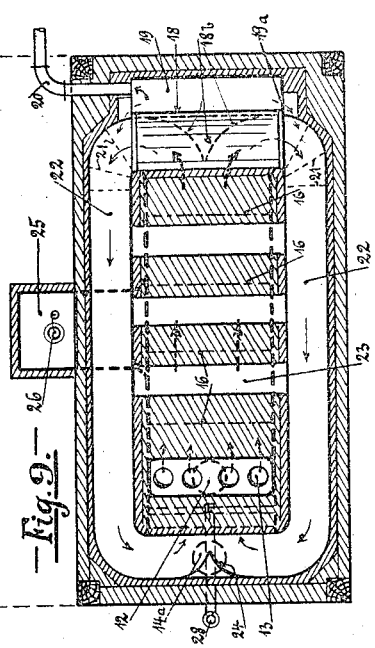
WITNESSES
INVENTOR
Wilhelm Mueller
BY
ATTY.

UNITED STATES PATENT OFFICE.

WILHELM MUELLER, OF ESSEN-ON-THE-RUHR, GERMANY.

RECOVERY OF AMMONIA FROM DISTILLATION-GASES.

1,045,590.  Specification of Letters Patent.  Patented Nov. 26, 1912.

Application filed September 3, 1910. Serial No. 580,440.

*To all whom it may concern:*

Be it known that I, WILHELM MUELLER, a citizen of Germany, residing at No. 17 Gutenbergstrasse, Essen-on-the-Ruhr, Germany, have invented certain new and useful Improvements in Recovery of Ammonia from Distillation-Gases; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to improvements for the recovery of ammonium sulfate from hot distillation gases of coal or other fuel, and has for its object to simplify the apparatus required, to produce perfectly pure tar and sulfate of ammonia in a direct manner without the use of steam or lime and in a very efficient manner.

According to this invention the distillation gases in their passage through the so-called ammonia saturator, which consists of an acid bath, cause the acid liquor therein to circulate so that particularly the surface liquor which acts on the incoming gases is constantly changed. Furthermore according to this invention the impurities which collect on the surface of the acid liquor forming the acid bath, are automatically removed in a continuous manner and thereby the surface of the bath presented to the incoming gases is always kept in a clean condition so that the incoming gases always meet clean acid liquor.

In carrying out this invention, between the point where the gases enter the acid bath chamber and the point where the gases leave said chamber, means are interposed in the path of said gases which force or cause the gases to repeatedly enter or dip into the liquor and thereby pass through a portion of the liquor at several different points in succession with the result that the gases set up or cause an active circulation of the liquor in the acid bath, one or more of the walls of the bath being so curved or formed that, a complete circulation is set up of the whole body (or practically the whole body) of the liquor of the bath. This circulation may either be caused to flow in a vertical circuit—by curving the ends of the chamber in the vertical direction; or may be caused to flow in a horizontal circuit—by curving the ends of the chamber in the horizontal direction. It may be arranged that any froth or impurities collected on the surface of the acid liquor (such as tar froth or the like) is or are caused to pass over the top edge of a wall or through an opening or openings provided for this purpose in the side or end wall or both of the chamber—and thus automatically remove such impurities from the surface of the acid bath or acid liquor.

The invention is illustrated in the accompanying drawings of which—

Figure 1 is a diagrammatic view of a plant for treating distillation gases, the plant comprising the improved ammonia saturator. Fig. 2 shows the saturator in sectional elevation. Figs. 3 and 4 are transverse sections on lines X—X and Z—Z respectively in Fig. 5. Fig. 5 is a plan of the apparatus shown in Fig. 2. Fig. 6 is a part section showing the baffle plates pivotally mounted on to the flat top of the saturating chamber. Fig. 7 illustrates a modified construction of the saturator; Fig. 8 is a vertical section and Fig. 9 a horizontal section through the saturator shown in Fig. 7.

Like reference letters indicate like parts throughout the drawings.

As may be seen from the drawings the apparatus (W) for removing the tar and cooling and washing the gas shown in Fig. 1 consists of an outer sheet-iron shell (3) inclosing an inner casing (4). Both the shell and the inner casing may be of round or angular section. The outer chamber (A) serves for the preliminary cooling, while the inner chamber (B) is used as a washer which latter is filled with hurdles or grids. The gas and washing-liquor are passed through the chamber (B) on the countercurrent principle so as to obtain an intimate intermingling of the liquor with the ascending gases. Near the top of the apparatus there are provided vertical and horizontal screens (5) through which the escaping gases have to pass. Spraying nozzles (6) arranged near the top serve for sprinkling the inner chamber (B) as well as the outer chamber (A) with gas-water, oil or any other suitable washing-liquor. Near the bottom of the inner washing chamber (B) there is provided a propeller or fan (8) driven from the outside by a bevel gear and motor (7) or other suitable means which fan serves to suck gases from the space (A) and force them upward. The gases are introduced into the apparatus, through one or two pipes, one of which (1) opens into the top part of the outer chamber (A), while another pipe (2) delivers the gas into the middle of the inner chamber (B) by means of an annular distribution socket (2ª) surrounding the inner chamber.

The above described washing apparatus (W) is directly connected by pipes (10 and 11) with the improved ammonia saturator (S), Fig. 2 or Fig. 7 oblong in plan and provided with a hopper shaped bottom and a flat top. The gas enters through an inlet pipe (12) which is widened at its lower end and may be provided with a number of distribution hoods (12ª) or pipes (13) of smaller diameter than the pipe (12) dipping into the liquor of the bath. The purified gas leaves through exit-pipe (14) Fig. 2 or (14ª) Fig. 7.

Unlike the common saturators, which are usually provided with a bell-shaped cover, the present saturator has a flat or straight top (15) which lies between the inlet and the exit-pipes and is provided with a number of baffle-plates (16) dipping into the bath and preferably inclined in the direction of the movement of the gases. These plates may be corrugated and may be provided with serrated edges. To enable the degree of immersion of the plates to be regulated as desired, the plates may be pivotally mounted on the cover as shown in Fig. 6 and may be connected by an operating rod (17) or similar means. At the end of the saturator chamber there is a froth-chamber (19). The partition wall (18) has a concave guide-surface (18ª) for deflecting the stream of liquid downward. Screens (19ª) are arranged in the chamber (19) and strain the liquor as the latter returns to the bath. The tar-froth and other impurities which accumulate in the froth-chamber (19) run off by a pipe (20) into a collecting tank (20ª) see Fig. 1. In the middle zone of the saturator are placed several perforated baffle-plates (21) for retaining the salts which might otherwise be carried round by the circulation produced in the bath.

In the modification in Figs. 7 to 9, the gas after passing the last baffle-plate (16), is not discharged directly outward, but is led through lateral flues or channels (22) which are connected by transverse passages (23), so that the gases before leaving the apparatus have to remain for some time in these spaces at the sides and in the roof of the saturating chamber proper and give up part of their heat to the liquor of the bath. For this construction of saturator the wall (18) of the froth chamber (19) is formed with two concave guide surfaces (18ᵇ) for deflecting the liquor laterally. Similar guide surfaces (24) are formed at the opposite end of the saturator. With this arrangement the froth is skimmed off, and the flow of the liquor at and near the surface is diverted laterally so that the circulation takes place in a horizontal plane instead of in a vertical plane as in the apparatus previously described. The perforated plates (21) shown in Fig. 2, may in the modification according to Figs. 7 to 9 be arranged at the entrance of the lateral flues (22). The saturator communicates at the bottom with a vertical shaft (25) from which the crystalline salts of ammonia are removed by means of a common steam ejector (26).

The saturators according to Fig. 2 or Fig. 7 are filled with a solution of sulfuric acid of about 30 to 35 degrees Baumé with a few percentages of free acid, the level of the liquid being preferably about two inches from the top of the chamber, this level being maintained constant by a supply of fresh acid from a high-level-tank (27) Fig. 1 through a pipe (28) provided with a suitable regulating cock. In addition to the pipe (28) another pipe (29) is arranged in the inlet pipe (12) and provided with a sprinkling nozzle (30) through which fresh acid is sprayed and mixed directly with the gas stream in order to facilitate and accelerate the absorption of the ammonia in the saturator. In order to increase the heat of reaction in the apparatus, the supply of fresh sulfuric acid may be preliminarily heated by a steam-coil or other suitable means in the reservoir (27) so that the acid enters the saturator in a very hot state. For further improvement of the temperature of the bath, the side walls of the saturating chamber can also be provided with a steam pipe coil (sp).

All inner surfaces of the saturator which come into contact with acid are lined with lead. The gas inlet or exit-pipe (12, 14 or 14ª) of the saturator may be connected with a blowing machine or exhauster (36), Fig. 1, of usual construction which forces or draws the gases to be washed through the apparatus and forces them for example into a gasometer. The apparatus is preferably placed in the immediate neighborhood of the ovens or retorts producing the gases and the pipes 1, 2, 10 and 11 are jacketed in order to avoid unnecessary cooling of the gas.

The process of treating the gases in the apparatus above described is as follows: In order to remove the by-products, more especially the tar and the ammonia, from coke-oven or distillation gases of coal or other fuel in a direct manner, it is essential first to separate the tar and other impurities from the hot gases, so that the ammoniacal-salts may not be polluted by tarry substances and rendered unsalable. To attain this the hot gases which come direct from the ovens or retorts (O) and are somewhat cooled in the collecting mains (V) and the pipes, are introduced at a temperature of about 200 degrees centigrade into the apparatus (W) see Fig. 1. The gases pass through the pipe (1) and enter the upper and the outer chamber (A) and descend to the openings (9) through which they pass to the fan (8) which forces them up into the washer. During their passage through the outer chamber the gases cool down to a temperature of about 100 degrees C, the major part of the tar, dust and other impurities being condensed and separated from the gases. To prevent the formation of tar or dust deposits on the sides the latter may be sprinkled with gas liquor or water from the top by means of the spray nozzles (6). The gases now pass upward through the washer (B) containing hurdles or grids. On passing through these hurdles the gas is repeatedly split up into numerous fine streams and is uniformly distributed throughout the whole space of the washer. Owing to the increased velocity imparted to the gases by the propeller or fan (8) and the fact that the gases dash or strike many times against the horizontal surfaces of the grids or hurdles all solid and liquid substances are separated. Since the hurdles are continuously sprayed from above and all surfaces are moistened by the liquor, the gases, in addition to the separating action due to the repeated impact, are brought into intimate contact with the washing-liquor and are therefore purified. The purified gas passes through the screens (5) arranged in the top part of the washer, which screens retain even the slightest traces of mist and tar-fog and escapes in a dry, hot state through the pipe (10) leading direct to the saturator (S).

The products of condensation obtained by the cooling and washing of the gases, viz. dust, tar, oil and gas-water collect in the bottom part of the apparatus (W) from which they automatically run through a siphon pipe (9a) to a settling tank wherein separation according to specific gravity takes place. The recovered gas-water and. if required, also the light thin tar may advantageously be pumped to the top of the apparatus and used again as washing-liquid, in which case they may be introduced through the spraying nozzles (6). The excess of gas-water which cannot be used for washing and contains only solid combinations of ammonia, is supplied without any further treatment to the acid bath of the saturator, or is otherwise disposed of as desired.

The hot gases passing through the outer chamber (A) keep the inner chamber of the washer at a constant high temperature which may be regulated in such a manner that the gases leave the apparatus at a temperature of about 70–80 degrees C. at which temperature all the ammonia still remains volatile. For this reason, the previously condensed hot gas-water or hot thin tar should be employed for spraying the hurdles so as to effect the washing of the gases without condensing the ammonia constituents.

When distilling coal or other fuel which produces gases very rich in tar, it is preferred to collect the gases in two fractions corresponding to about the first three-fourths and the last quarter of the period of distillation, separate mains being used for the two fractions. The gas obtained during the first three-fourths of the distillation, which gas contains most of the tar and the impurities, is introduced through pipe (1) and has to pass through the whole of the apparatus in the manner already described. The gas produced during the last quarter of the distillation is introduced through pipe (2) and duct (2a) in the middle of the apparatus where it mixes with the gases produced during the first three-fourths of the distillation process, and is subjected herewith to the washing action. As is well known the gases of the last period are much hotter than the gases rich in tar produced during the first period, and often cause incrassation of the tar in the apparatus, if the gases of both periods are treated simultaneously. This drawback is however obviated if the gases enter the apparatus separately and are mixed only after the gases of the first period are more than half washed. By introducing the hot gases of the second period only into the upper portion of the washer, the hot gas-water (or thin tar) used as washing liquor is still further heated whereby the ammonia constituents contained in the gas-water is vaporized and caused to escape together with the gas.

The hot gas still charged with all the ammonia combinations is passed from the washer (W) through pipes (10) and (11) directly into the sulfuric acid bath of the saturator (S), see Fig. 2 or Fig. 7. It enters the bath through the widened end of pipe (12) with its distribution hoods (12a) or through a number of smaller pipes (13), bubbles up through the bath to the top (15) of the saturator, and then moves in a thin and wide stream over the surface of the bath to the exit, being compelled to pass repeatedly into the acid by the baffle-plates (16) which dip into the bath and are inclined in the direction of the gas current. All the impurities collecting on the surface, such as tar-froth or the like, are carried toward the end of the bath and caused to pass over the wall (18) into the froth-chamber (19) from which they run outward into a tank or cask (20ª) through a pipe (20). The liquor carried together with the froth into the chamber (19) returns to the bath through the screens (19ª) at the bottom. In this way the surface of the bath is always kept in a clean condition. The concave inner guide surface (18ª) Fig. 2 or (18ᵇ) and (24) Figs. 7 and 9 of the wall (18) of the chamber (19) directs the flow of the liquid back, either in the downward direction as in Fig. 2, or in the lateral directions as in Figs. 7 and 9. Owing to this circulation the upper zone of the acid bath is thoroughly stirred and the efficiency is increased while the consumption of the acid is reduced to a minimum. For the same purpose and in order to prevent condensation of the aqueous vapors contained in the gas, the saturating chamber is heated laterally by means of the steam pipe coil ($sp$) and the additional sulfuric acid or acid-lye is supplied to the saturator at a high temperature through pipe (28 or 29) whereby the reaction heat is increased. By the introduction of hot sulfuric acid from the reservoir (27) through pipe (29) and nozzle (30) direct into the gas inlet pipe (12) of the saturator a more intimate intermingling with the gas and a quicker absorption of the ammonia is attained.

The plates (21) arranged according to Fig. 2 in the middle zone of the saturator retain the solid salts of ammonia carried forward by the circulation of the bath and cause the salts to settle. These perforated plates (21) are arranged in the construction according to Figs. 7, 8 and 9 near the entrance of and also further along the lateral passages (22). The solid salt of ammonia produced in the saturator by the reaction of the ammonia upon the sulfuric acid drops into the lower collecting chamber (25), and is lifted in a well known manner by means of a steam ejector (26) to a draining table (31) from which latter it is delivered to the centrifugal drying machine (32) which leaves the salt in a salable condition and ready to be stored. The separated liquor runs into a liquor-pot (33) which automatically returns the liquor to the bath in the saturator for further treatment. The gases which are entirely purified from tar and ammonia are finally drawn from the saturator through an acid separator (34) and pipe (35) by means of an exhauster or blowing engine (36) which forces them into a gasometer in which they are stored to be used for illuminating, heating or motive-power purposes.

The new method of producing the ammonia in a "direct" manner without the aid of steam or lime and the simplified construction of the apparatus enable the recovery of the by-products to be effected in a much more economical way than hitherto, and have the further advantage that the employment of the usual arrangement for washing and distilling with their inevitable poisonous effluent liquor and mud nuisance is entirely dispensed with.

The present invention renders it possible not only to obtain a complete absorption of all the ammonia from the gas without any employment of the usual so-called after-separator, but also a clean white salt of ammonia is obtained, while the consumption of acid is reduced to practically the minimum.

I claim:

1. A saturator for the treatment of distillation gases comprising a closed receptacle adapted to contain an acid bath, a gas inlet thereto and exit therefrom, and gas deflecting means disposed between said inlet and exit and adapted to depend into said bath and obstruct the path of the gases through the space above the surface of said bath, said gases being thereby caused to descend several times beneath the surface of the bath in performing their course from the inlet to the exit substantially as set forth.

2. A saturator for the treatment of distillation gases comprising a closed receptacle adapted to contain an acid bath, a gas inlet thereto and exit therefrom, gas deflecting means disposed between said inlet and exit and adapted to depend into said bath and obstruct the path of the gases through the space above the surface of the said bath said gases being thereby caused to descend several times beneath the surface of the bath in performing their course from the inlet to the exit, and an overflow wall arranged adjacent to said exit and having its upper edge at about the level of the surface of said bath substantially as set forth.

3. A saturator for the treatment of distillation gases comprising a closed receptacle adapted to contain an acid bath, a gas inlet depending into said bath at one end thereof distributing means on said inlet, gas deflectors depending from the cover of said receptacle, a gas exit from the opposite end of said bath, and a combined overflow wall and liquid deflector at the exit end of said receptacle the upper edge of said wall being arranged at a higher level than the lower edges of said gas deflectors substantially as set forth.

4. A saturator for the treatment of distillation gases comprising a closed receptacle adapted to contain an acid bath, a gas inlet depending into said bath, at one end thereof, distributing devices in connection with said inlet, gas deflectors depending from the cover of said receptacle, a gas exit from the opposite end of said bath, a curved concave surface at one end of said bath adapted to deflect the current of liquid set up by the flow of gas, and an overflow wall for said liquid at the exit end of said bath the overflow edge being at a higher level than the lower edges of the depending deflectors substantially as set forth.

5. Apparatus for recovering ammonium sulfate from distillation gases comprising, in combination, a saturating chamber adapted to be filled almost to the top with a solution of sulfuric acid and provided with a horizontal top; transverse baffle-plates dipping into the liquor of the bath and adapted to be angularly adjusted by means of a guide rod; lateral flues or channels around the saturating chamber proper, said flues being connected at the top by transverse flues; a steam pipe coil in the side walls of the saturating chamber; a froth-chamber bounded on one side by a wall formed with concave guide-surfaces facing toward the bath for diverting the flow of liquor in the bath; concave guide-surfaces arranged at the opposite end of the chamber, a gas inlet pipe provided with distribution means, an acid supply pipe entering said gas inlet pipe, a spray nozzle on the delivery end of said supply pipe, and a gas exit pipe arranged on the saturating chamber.

In testimony that I claim the foregoing as my invention, I have signed my name in presence of two subscribing witnesses.

WILHELM MUELLER. [L. S.]

Witnesses:
   CHAS. J. WRIGHT,
   ALFRED HENKEL.